United States Patent
Adriaans et al.

(10) Patent No.: US 6,311,175 B1
(45) Date of Patent: Oct. 30, 2001

(54) SYSTEM AND METHOD FOR GENERATING PERFORMANCE MODELS OF COMPLEX INFORMATION TECHNOLOGY SYSTEMS

(75) Inventors: Pieter Willem Adriaans, Kockengen; Arno Jan Knobbe, Houten; Marc Gathier, Nieuwegein, all of (NL)

(73) Assignee: Perot Systems Corp., Dallas, TX (US)

( * ) Notice: Subject to any disclaimer, the term of this patent is extended or adjusted under 35 U.S.C. 154(b) by 0 days.

(21) Appl. No.: 09/036,393

(22) Filed: Mar. 6, 1998

(51) Int. Cl.[7] ........................... G06F 15/18

(52) U.S. Cl. ........................... 706/25

(58) Field of Search ........................... 706/25

(56) References Cited

U.S. PATENT DOCUMENTS

| | | | |
|---|---|---|---|
| 4,825,195 | 4/1989 | Berruyer | 340/501 |
| 5,461,628 | 10/1995 | Nakamura | 714/712 |
| 5,469,463 | 11/1995 | Polich et al. | 714/20 |
| 5,487,131 | 1/1996 | Kassatly et al. | 706/53 |
| 5,528,516 | 6/1996 | Yemini et al. | 702/181 |
| 5,568,471 | 10/1996 | Hershey et al. | 370/245 |
| 5,612,949 | 3/1997 | Bennett | 370/253 |
| 5,615,341 | 3/1997 | Agrawal et al. | 395/210 |
| 5,661,668 | 8/1997 | Yemini et al. | 364/550 |
| 5,668,944 | 9/1997 | Berry | 395/184.01 |
| 5,704,017 | 12/1997 | Heckerman et al. | 706/12 |
| 5,715,432 * | 2/1998 | Xu et al. | 345/356 |
| 5,724,573 | 3/1998 | Agrawal et al. | 395/606 |
| 5,748,098 | 5/1998 | Grace | 370/242 |
| 5,802,254 | 9/1998 | Satou et al. | 706/58 |
| 5,812,997 | 9/1998 | Morimoto et al. | 707/2 |
| 5,832,482 | 11/1998 | Yu et al. | 707/6 |
| 5,897,627 | 4/1999 | Leivian et al. | 706/12 |

FOREIGN PATENT DOCUMENTS

WO 96 00419A  1/1996 (WO).

OTHER PUBLICATIONS

Microsoft Press Computer Dictionary: Third Edition 360, 415, 1997.*
Andrew S. Tananbaum, Computer Networks: Third Edition, Chapter 6—The Transport Layer, 1996.*
Raul Velez, Du Zhang and James Kho,by Raul Velez, Du Zhang and James Zho, *An Intelligent Tool for Unix Performance Tuning*, Proceedings of the 1993 IEEE International Conference on Tools with Artificial Intelligence, TAI, 1993; Boston MA.; Conf. No. 5, Nov. 8–11, pp. 118–122, XP000436431.
A.J. Knobbe. *Data Mining for Adaptive System Management*, Proceedings of the First International Conference on the Practical Application of Knowledge Discovery and Data Mining, PADD, 1997; Apr. 23–25, pp. 157–165, XP002105193.
Syllogic White Paper; *Adaptive Systems Management*, Version 2.1, Jan. 1998, pp. 1–14; Retrieved from Internet; Jun. 2, 1999; XP002105194.

* cited by examiner

Primary Examiner—George B. Davis
Assistant Examiner—Michael B. Holmes
(74) Attorney, Agent, or Firm—Jenkens & Gilchrist PC

(57) ABSTRACT

A system and method for automatically creating performance models of complex information technology (IT) systems. System components and elements are subject to periodic monitoring associated with performance thresholds. A continuity analysis is performed by synchronizing testing functions associated with the predetermined system performance thresholds. Resulting data is accumulated and data mined for component and functional relations within the IT system. Models of the system may then be adapted with results generated from the analysis.

59 Claims, 3 Drawing Sheets

SYSTEM AND METHOD FOR GENERATING PERFORMANCE MODELS OF COMPLEX INFORMATION TECHNOLOGY SYSTEMS

BACKGROUND OF THE INVENTION

TECHNICAL FIELD OF THE INVENTION

The present invention relates to complex information technology systems (IT) and, in particular, to continuity analysis techniques for discovering relations among complex events occurring in such systems, and, more particularly, to techniques for improving the performance of such IT systems through iterative system modeling.

BACKGROUND AND OBJECTS OF THE INVENTION

With the exponential growth of the computer and the computer industry, information technology (IT) systems have become increasingly complex and difficult to manage. A typical IT system in even a small company may contain dozens of computers, printers, servers, databases, etc., each component in some way connected to the others across the interlinkage. A simplified example of an interconnected IT system is shown in FIG. 1, described in more detail hereinafter.

Although interconnected systems, such as the one shown in FIG. 1, offer many advantages to the users, e.g., resource sharing, as such systems grow and the number of component interlinkages increase, the behavior of these complex systems becomes more difficult to predict. Further, system performance begins to lag or becomes inconsistent, even becoming chaotic in nature. The addition or removal of one component, even seemingly minor, could have dramatic consequences on the performance of the whole system. Even an upgrade on one component could adversely affect a distant, seemingly unrelated component. The system and method of the present invention is directed to techniques to better predict the behavior of complex IT systems, offering system administrators the opportunity to identify problem areas such as performance bottlenecks and to correct them prior to a system or component failure.

Conventional approaches to system performance monitoring are inadequate to easily divine the nature of a performance problem in a complex IT system since any data collected in monitoring is generally useless in ascertaining the true nature of the performance difficulty. The system and method of the present invention, however, provide a mechanism whereby system monitoring data is made easily accessible and usable for analyzing current performance and predicting future performance. The present invention facilitates this analysis through use of data mining principles discussed further hereinafter.

In general, data mining is an analysis of data, such as in a database, using tools which determine trends or patterns of event occurrences without knowledge of the meaning of the analyzed data. Such analysis may reveal strategic information that is hidden in vast amounts of data stored in a database. Typically, data mining is used when the quantity of information being analyzed is very large, when variables of interest are influenced by complicated relations to other variables, when the importance of a given variable varies with its own value, or when the importance of variables vary with respect to time. In situations such as these, traditional statistical analysis techniques and common database management systems may fail or become unduly cumbersome, such as may occur when analyzing an IT system.

Every year, companies compile large volumes of information in databases, thereby further straining the capabilities of traditional data analysis techniques. These increasingly growing databases contain valuable information on many facets of the companies' business operations, including trend information which may only be gleaned by a critical analysis of key data interspersed across the database(s). Unfortunately, because of the sheer volume and/or complexity of the available information, such trend information is typically lost as it becomes unrecoverable by manual interpretation methods or traditional information management systems. The principles of data mining, however, may be employed as a tool to discover hidden trend information buried within the pile of total information available.

Such data mining techniques are being increasingly utilized in a number of diverse fields, including banking, marketing, biomedical applications and other industries. Insurance companies and banks have used data mining for risk analysis, for example, using data mining methods in investigating its own claims databases for relations between client characteristics and corresponding claims. Insurance companies have obvious interest in the characteristics of their policy holders, particularly those exhibiting risky or otherwise inappropriate activities or behaviors adverse to the companies' interests, and with such analyses, are able to determine risk-profiles and adjust premiums commensurate with the determined risk.

Data mining has also found great success in direct marketing strategies. Direct marketing firms are able to determine relationships between personal attributes, such as age, gender, locality, income, and the likelihood that a person will respond to, for instance, a particular direct mailing. These relationships may then be used to direct mailing towards persons with the greatest probability of responding, thus enhancing the companies' prospects and potential profits. Future mailings could be directed towards families fitting a particular response profile, a process which could be repeated indefinitely and behaviors noted. In this sense, the data mining analysis learns from each repeated result, predicting the behavior of customers based on historical analysis of their behavior.

In the same manner demonstrated hereinabove, data mining may also be employed in predicting the behavior of the components of a complex information technology (IT) system, such as the one shown in FIG. 1 or a more complicated one found in the business environment. Similar approaches as above with appropriate modifications can be used to determine how the various interconnected components influence each other, uncovering complex relations that exist throughout the IT system.

As discussed, multiple applications will be operated within a common IT infrastructure, such as the one shown in FIG. 1. Often, these applications will utilize some of the same resources. It is obvious that the sharing of IT infrastructure resources among different applications may cause unexpected interactions on system behavior, and that often such unexpected interactions, being non-synergistic, are undesirable. An example would be multiple business applications sharing a router within an IT system. As illustrated, a particular application, e.g., an E-mail service, burdens a router in such a way that other applications do not function well. In this example, it is reasonable to expect numerous applications to, at times, share usage of the router. Traditional systems management techniques may prove difficult in determining which specific application is causing loss of system performance. This example further explains why there is a need to find hidden relationships among IT system components and applications running in such environments. By way of solving the problem in this example, it may be necessary to reroute E-mail traffic through another router to obtain adequate performance for the other applications.

Traditional IT system management is now generally defined as including all the tasks that have to be performed to ensure the capability of the IT infrastructure of an organization to meet user requirements. Shown in FIG. 2 is a traditional IT systems management model, generally designated by the reference numeral 200. Essentially, there are groups of system administrators 210 having knowledge of the IT infrastructure, such as the one shown in FIG. 1 and generally designated herein by the reference numeral 220, which they are managing. Typically, the knowledge of the infrastructure 220 is scattered among the various personnel making up the system administrator group 210. The total of this knowledge is limited to the sum of the individual administrators' knowledge, where invariably there is a great deal of redundancy of knowledge. This redundancy may be considered an inefficiency of the overall knowledge base. In other words, a theoretical maximum knowledge of the infrastructure 220 would be realized only when each individual administrator of the administration group 210 had knowledge that was unique to that specific administrator. While this may appear to be an ambiguous analysis of the effectiveness of the group, it is of real consequence for the company that must finance a group of administrators. Furthermore, this knowledge is typically not stored in an easily retrievable electronic form.

When system monitoring is included in the aforementioned traditional management system, this monitoring is usually limited to real time data, such as the current system load and the like. An administrator may observe such reporting of real time data, and if system loads or events being monitored are found to be consistent with loads that the administrator recognizes to be associated with impending system malfunction or loss of performance, that administrator may redirect part of the load through alternative subsystems of the IT infrastructure to avert problems.

Often, such real time data reporting may be used in coordination with a system model of the IT system, of which data is being collected and reported. The model usually includes a computer algorithm that utilizes code governing the relations among various system devices. A problem with such models, however, is that the relations used in modeling the system account only for expected interactions among components and subsystems. The model is, therefore, merely an idealized model of the actual system. Hidden or unexpected relations that exist between components would not be accounted for. Furthermore, as the infrastructure 220 is modified, the model must be manually altered to include new relations in the model algorithm to account for the changes made.

An improvement over this traditional management system is realized in the so-called expert system. An expert system is a form of artificial intelligence in which a computer program containing a database, frequently referred to as a knowledge base, and a number of algorithms used to extrapolate facts from the programmed knowledge and new data that is input into the system. The knowledge base is a compilation of human expertise used to aid in solving problems, e.g., in medical diagnosis. The utility of the expert system is, however, limited to the quality of the data and algorithms that are input into the system by the human expert.

Typically, expert systems are developed so that knowledge may be accumulated from a person or persons skilled in a specific area of technology and stored in an easily retrievable media. This way, persons less skilled than the experts, whose knowledge was accumulated within the expert system, have access to such expert information. In this manner, a company may save human and financial resources by having less skilled personnel access such expert systems instead of requiring the expert to handle all of such situations requiring a certain level of knowledge.

Utilization of such expert systems allows less skilled persons to also analyze IT systems behavior. These systems may be used to aid in troubleshooting faults in an IT system or they may be used to assist in predicting such faults with the assistance of system performance monitors, ie., a person with access to an expert system applied to a particular IT system may, through appropriate monitors, study system load parameters or the like and through the use of the expert system, make estimates of potential faults due to system bottlenecks or the like.

A significant drawback of expert systems, however, is that they are poorly equipped to handle newly encountered problems or situations. In this manner, it is clear that expert systems are limited in their technical capability of resolving novel issues. Instead, expert systems require a complete model of all the events or failures that can occur in the system being modeled.

The present invention is a further progression on the aforedescribed conventional art. In a manner similar to the way in which data mining techniques are applied to predict the behavior of, for instance, the customers in the direct marketing example, the idea of such techniques may likewise be applied to complex IT systems in determining and predicting the behavior of IT components. The system and method of the present invention, when implemented, facilitate the determination of how the interlinked components influence each other in terms of performance, potentially uncovering unexpected relations among different components of an IT system. This is accomplished using a continuity analysis performed in conjunction with the aforementioned data mining techniques on historical IT system and subsystems state and simulation test data.

It is clear that with today's increasingly interconnected and complex IT infrastructures and the corresponding increases in maintenance costs of such systems, a system and method for discovering deleterious relationships between various subsystems and elements of such complex networks in a substantially automated manner is certainly a valuable tool.

It is also an object of the present invention to have an automated means of accumulating the assortment of data that may be analyzed by an appropriate data mining technique, such that performance models of complex IT systems based on periodic measurements of predefined performance levels may be generated or updated. Additional description on data mining techniques applied in the context of the present disclosure may be found in Applicants' co-pending patent application, U.S. patent application Ser. No. 09/036,394, entitled "System and Method for Model Mining Complex Information Technology Systems", filed concurrently herewith, which is incorporated herein by reference.

Another desirable feature of an IT system, such as one incorporating the improvements of the present invention, is to reduce the amount of human intervention required for the system to adapt to dynamic system changes. This is preferably accomplished through automation.

It is further desired that the system and method of the present invention analyze system performances with Boolean attributes, i.e., true or false.

SUMMARY OF THE INVENTION

The present invention is directed to a system and method for automatically creating performance models of an information technology (IT) system by use of a continuity analysis, preferably in conjunction with data mining techniques. Adaptive system management is defined as the realization of proactive system management with adaptive techniques that automatically create models of the system and that can learn to plan and predict the effects of management actions in order to meet the various user requirements. IT Service Level Agreements (SLAs), or performance requirements, are predefined constraints or thresholds placed on the system. Performance monitoring of the system is then implemented, from which databases of system state information are determined and stored.

A continuity analysis is then performed on the IT system or subsystem thereof by synchronizing SLA performance simulations with system monitoring activity, and accumulating both in a historical database. A model of the system environment is then used as input for the continuity analysis. The environment may be defined with any level of detail and is not necessarily a complete or consistent model of the actual system. The system and method of the present invention is preferably implemented with a collection of data monitors placed throughout the system. These monitors periodically check the state of various elements of the system, storing the monitored data in a database.

A test program is then executed, with execution being synchronized with relative monitoring activity, to simulate specific IT system actions related to a specific predefined SLA. Execution of the test programs, and the monitoring activities, are preferably performed automatically and at fixed intervals of time. Results of the test program are time measurements of the SLA-related actions, which are preferably expressed as real numbers, and which are stored in a database with a time stamp and corresponding monitored system data or equivalently, in an array type data storage scheme. Additional input includes the SLAs themselves. These thresholds are used to convert the real numbers from the test program into Boolean values, these Boolean values indicating whether or not the predefined threshold was exceeded or not. This Boolean information is then output to characterize the influence of the various monitor values on the targeted performance variable, or the SLA. This information may then be used in a number of ways, including trend analysis, performance optimization, and monitor optimization.

BRIEF DESCRIPTION OF THE DRAWINGS

A more complete understanding of the system and method of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 3:
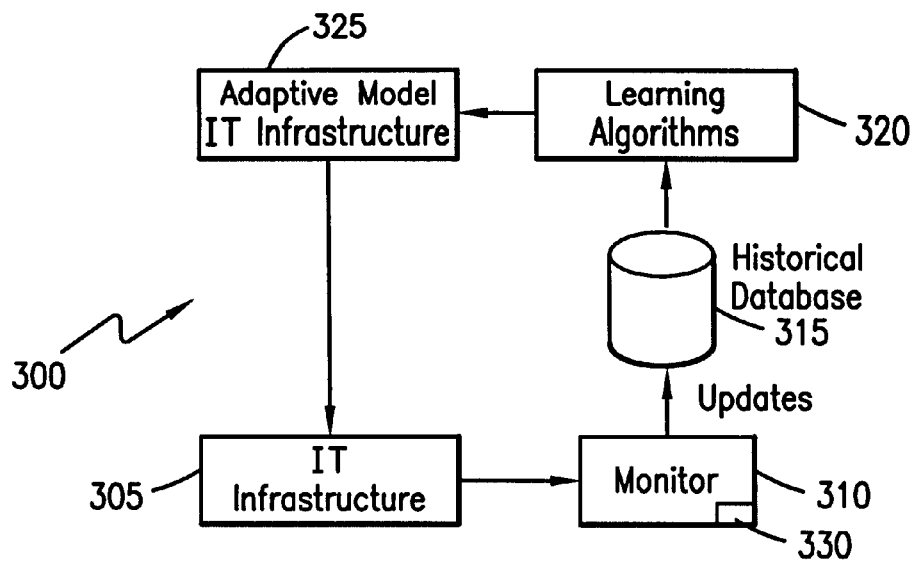
FIG. 3 is a block diagram of a system and method for adaptive system management in accordance with the present invention.

FIG. 3 shows a model of an adaptive system management scenario 300 in accordance with the system and method of the present invention. The application of data mining on an information technology (IT) system, such as the one shown in FIG. 1 and generally designated by the reference numeral 305, is illustrated in FIG. 3, in which the IT system 100/305 is connected to at least one monitor 310 which monitors the performance of the IT system 305. The monitor 310 is connected to a historical database 315, which is used to store various performance measurements on the IT system 100. The historical database 315, in turn, is connected to a number of learning algorithms 320. Elements or events relating to the IT system or infrastructure 305 are monitored throughout the system by appropriate monitoring schemes housed within the monitors 310.

Data from the aforementioned monitoring is forwarded by the monitors 310 and input into the historical database 315. The data within the historical database 315, including the newly updated information on the IT system 305 performance is then subjected to specific learning algorithms 320. The learning algorithms 320 may recognize new patterns or relationships between discrete events occurring in the IT system 305. The learning algorithms 305 then update an adaptive model of the IT infrastructure, generally designated herein by the reference numeral 325.

The management environment stores all collected information and uses various learning techniques to learn about the IT system 305 being managed. It should be understood that the aforementioned learning algorithms 320 are well-known to those skilled in the art. These learning techniques enable the management environment to better adapt itself to the IT infrastructure 305 being managed. Accordingly, once additional information becomes available about the IT infrastructure 305, better management of the system environment is possible. Further information will then be collected and stored so that the learning process continues. In fact, the entire monitoring, learning, and adapting process provided by the system and method of the present invention is continuous and iterative.

In devising such a dynamic learning model as disclosed in the present invention, it is first necessary to define thresholds for various system performances. These thresholds are hereinafter referred to as service level agreements or SLAs, which in the present invention are simply a numerical threshold used to evaluate a particular performance level of any number of system components or elements. The SLAs serve to convert numerical formatted data that is monitored into Boolean values indicating whether the SLA threshold was met or not.

Figure 1:
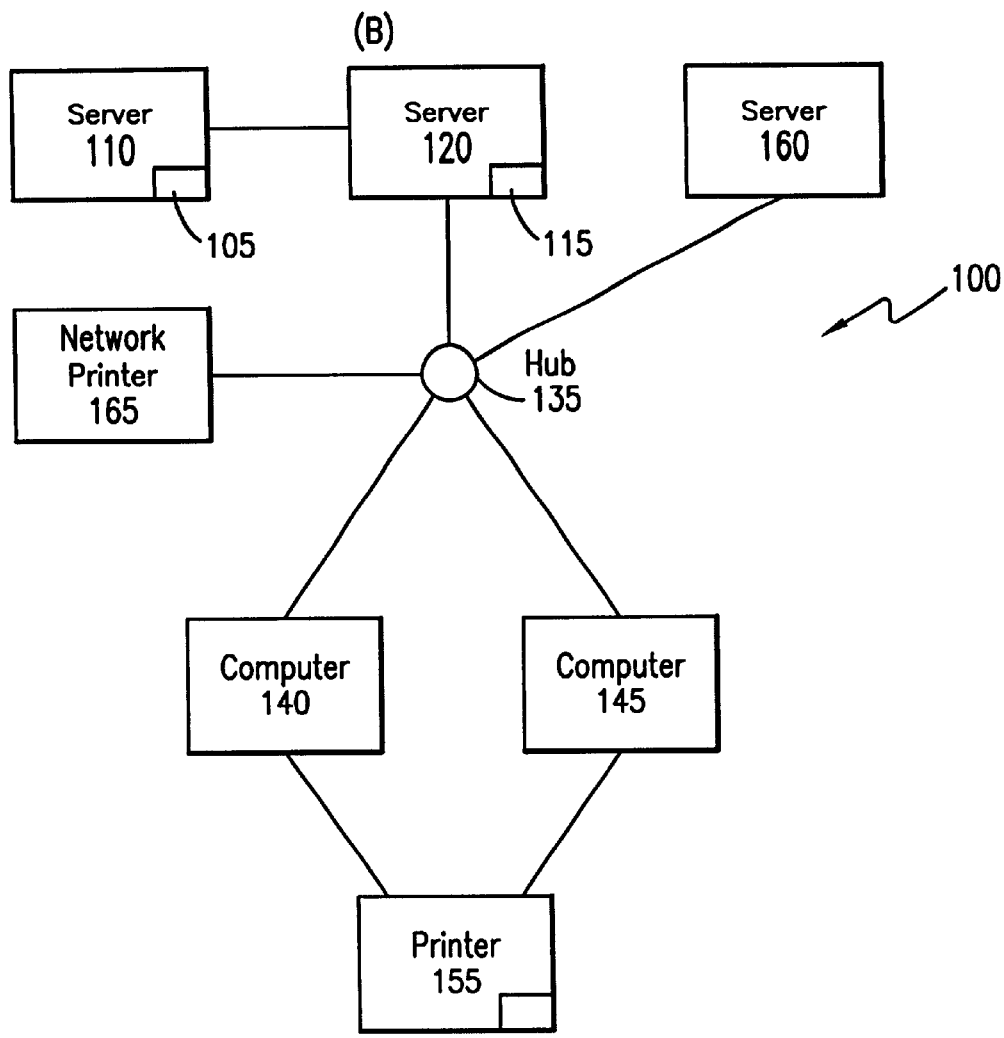
FIG. 1 is an exemplary network system upon which the system and method of the present invention may be employed.
Figure 2:
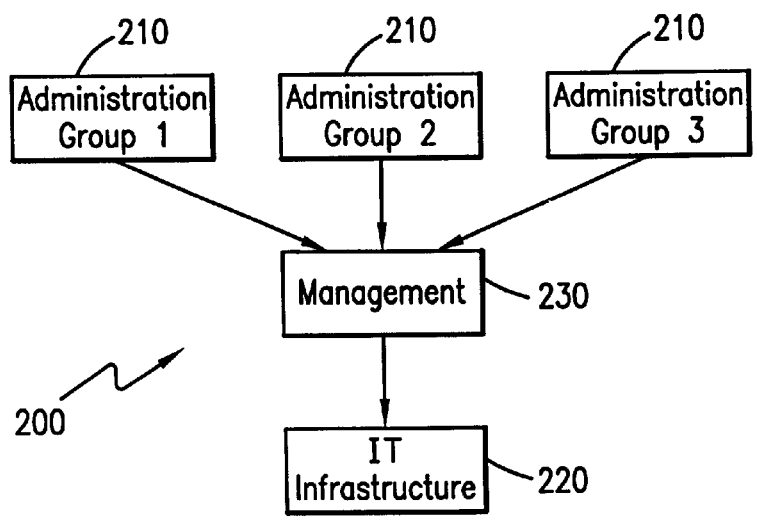
FIG. 2 is a block diagram of a traditional IT systems management method.

As an example of such an SLA, reference is now made to a database 105 in FIG. 1 which is resident on a system server 110 such that numerous and diverse users may query the database 105. In querying database 105, it is reasonable that a login must be first performed through the server 110. This login, however, may conventionally be performed through another server and database, which is shown in FIG. 1 as server 120 and database 115, respectively. Therefore, for a system user to remotely query database 105, login is first executed through database 115, which upon a successful login grants the user rights to query database 105. For this entire operation, a performance threshold may be established by knowledgeable management personnel, designated in FIG. 2 by the reference numeral 230. Typically, such a threshold would be formed with knowledge of the server 110 and 120 performances on which databases 105 and 115, respectively, reside and a general knowledge of data traffic through these servers.

For this example, assume the startup time of database 105 is a reasonable measure of the performance of database 105. Therefore, the targeted performance level of database 105, i.e., its SLA, could be constructed from the access times of both databases 105 and 115. Here, the SLA may be delineated as $SLA_A$ where A represents database 105. Since access time has been assumed to be a good measure of performance of such an application, total access time for database 105 includes the access time of database 115 since effective execution of database 105 is prolonged by the execution of database 115 which is also referred to herein by the reference indicator B. For this case, the total access time, $AT_{AB}$, for the startup of database 105 may be found from the sum of the startup times of the individual databases, $AT_A$ and $AT_B$, in other words, $$AT_{AB} = AT_A + AT_B$$

Assume that the study of the individual applications and hardware from which execution of these applications are executed indicates that it is reasonable for the execution of database 115 to take place in no more than 1 second and subsequent execution of database 105 in no more than 2 seconds. From this information, the target for total startup time of database 105, $AT_{AB}$, would be for the execution of database 105 in no longer than 3 seconds. This threshold for execution of database 105, including the required access time of database 115, could then be defined for the SLA of database 105, hereinafter designated as $SLA_{AB}$. This SLA would appropriately be recorded as:

$$SLA_{AB} \leq 3 \text{ seconds}$$

This SLA would indicate, in a Boolean format, that execution of database 105 in a time of less than or equal to 3 seconds is satisfactory, e.g., a logical one, and an execution time exceeding 3 seconds is unsatisfactory, e.g., a logical zero. Alternatively, individual thresholds may be defined for databases 105 and 115 and a threshold for overall performance of database 105 obtained by simply summing the individual thresholds, as follows:

$$SLA_A \leq 2 \text{ seconds}$$

$$SLA_B \leq 1 \text{ seconds}$$

$$SLA_{AB} \leq 3 \text{ seconds}$$

In defining such thresholds, it should be apparent that the greater the number of SLAs and monitors 310, shown in FIG. 3, monitoring the IT system 100, shown in FIG. 1, the better the system may be evaluated. Ideally, the majority of IT system 100 components would have SLAs associated with them. Realistically, however, extensive system monitoring presents logistical problems, generally resulting in simpler rather than more complicated models. Nonetheless, as is apparent to those skilled in the art, the greater the number of SLAs that may be defined and implemented within the IT system 100, the greater the accuracy of the system model and technique of the present invention in monitoring system performance.

In order to apply the aforementioned data mining techniques and learning algorithms to historical data on the IT system 100, it is first necessary to build the aforementioned historical database 315, as shown in FIG. 3. It has been determined that the most advantageous method of storing such data is in a conventional relational database format. Typically, all monitored data from the monitors 310 are directed to one central storage location, i.e., the historical database 315. It should be understood, however, that each monitor 310 may have its own local memory 330 for storing the monitoring data temporarily, e.g., over a minute, hour, etc., and then later sent to the central historical database 315 where the aforementioned data mining applications may be used to analyze the data.

It should be understood that the data monitors 310 may be placed throughout the IT infrastructure 100/305 at various components within the system. Monitoring activity may be directed to any number of components, applications or other resources with, in general, the overall effectiveness of the present invention enhanced with a corresponding increase in the number of monitors 310 being utilized. These monitors 310 preferably perform their specific monitoring activity automatically and at specific time intervals, collecting data periodically, e.g., once every minute, ten minutes, hour, etc. The type of data being monitored and stored in the historical database 315 may be generally described as state or usage information on a component level, e.g., a harddisk, database, server or other network segment such as the components shown in FIG. 1. For instance, a monitor 310 used to monitor and record historical data on a particular harddisk may record the free capacity of the disk and whether the disk is being accessed or not. Similar data collected from monitoring a database may include the number of users accessing the database, query volume, and access time.

In order to perform the continuity analysis on the system 100, it is necessary to evaluate specific system functions over set and defined intervals. For this reason, test programs are utilized to evaluate whether the system 100 is performing within one or more of the aforementioned SLAs. For example, it would not be effective to measure and evaluate a specific action against its SLA only when that action is taken by a person on the network. Such actions would most likely occur pseudo-randomly and would, therefore, not give good indications of the overall performance of the system 100 with respect to time.

To evaluate the system more effectively, test programs are used to simulate those functions that have associated SLAs. In utilizing test programs at defined moments in time, continuity analyses may be performed on the test and monitored data as functions of time. For example, in the case of the SLA used for the startup times of databases 105 and 115, a test program would be set up on the server side of the network 100 to simulate a query to these databases. This test program would preferably be executed automatically and at fixed intervals of time. Furthermore, this test program would be substantially synchronized with monitoring events related to the evaluation of the corresponding SLAs.

For the example of $SLA_{AB}$ as previously defined, a test program to simulate the startup of database 105, with the inclusive startup of database 115, is required. It should be understood that the test program may be executed on the server or client side, the preference being to have the test program executed on both sides. Executing the test program on both the client and server side, however, requires separate SLAs on both system sides. For simplicity of discussion, consideration will only be given to server-side evaluation hereinafter. Therefore, a test program or simulation is performed on the server side that simulates a query on database 105. In doing so, database 115 must first accept a login. This login is included in the simulation. The test program executes the login and database query, recording the startup time of database 115 and database 105. These startup times recorded from the test program are generally numerical in nature, and are subsequently converted to Boolean values through the aforedescribed comparisons to the associated SLAs. For this example, assume that on execution of the test program for a query to database 105, startup time for database 115 was recorded to be 1.25 seconds while subsequent startup time of database 105 was recorded to be 1.5 seconds. The access times, AT, of both would be recorded similar to that given below:

$AT_B=1.25$ $AT_A=1.5$

The total startup time of database 105 including the prerequisite startup time of database 115 is simply the sum of the two startup times, i.e., $AT_{AB}=2.75$ seconds.

The associated SLAs, previously defined, are again given below:

$SLA_A \leq 2$ seconds $SLA_B \leq 1$ seconds $SLA_{AB}=SLA_A+SLA_B \leq 3$ seconds Failure to meet the requirements of an SLA may be assigned a Boolean low, i.e., False or logical zero, and performances meeting the pertinent SLA being assigned a Boolean high, i.e., True or logical one. The numerical results of the test program may then be converted to Boolean attributes by comparisons to their respective associated SLA thresholds. In doing so, the test program results of the current example would respectively be assigned Boolean values as follows:

Does_performance_of_A_meet_SLA$_A$?=TRUE

Does performance_of_B_meet_SLA$_B$?=FALSE

Does_performance_of_AB_meet_SLA$_{AB}$?=TRUE

As indicated hereinbefore, A indicates database 105 and B indicates database 115.

These Boolean test program attributes will then be stored, e.g., in logical format, typically along with their numerical counterparts, in the aforementioned historical database 315, as is understood in the relational database art. Preferably, the numerical and Boolean values would each be assigned separate fields within the database 315, as is also understood in the relational database art. Associated with these records is a clock or time stamp indicating the position in history at which that test data was gathered. This time stamp is preferably allocated a separate field for each record or monitoring event in the historical database. Since system monitoring is synchronized with the execution of the aforedescribed test program, system state monitoring data is stored concurrently with test program results. This monitoring data effectively shares the time stamp with the test program results.

A final input is an original system model, upon which the system and method of the present invention builds, improving the accuracy and performance of the underlying system 100, illustrated in FIG. 1. It should be understood that the model of the IT system 100 is preferably developed such that it supports the functions for which SLAs are defined. It should also be understood, however, that the model may be defined at any level and it is not necessary that the model be complete or consistent as is the case for expert systems. This is true due to the iterative adaptiveness of the overall system and method of the present invention in that over time the model automatically refines and corrects itself.

With the discussed inputs considered, the output of the system and method of the present invention may now be considered. Once sufficient historical data has been collected and stored in the database 315, data mining techniques familiar to those skilled interrogatory in the art may be applied to this collection of monitored data and its associated test data. Data mining techniques are then applied to these data and the various relations between the monitored system state data and the data on test performance success or failure are uncovered. These newly discovered relations are then used to update the existing IT model, thereby rendering the model adaptive. This unique feature of the present invention, i.e., its ability to adapt itself to the system it is used to monitor and model, enables the original model to be incomplete or inconsistent.

Figure 4:
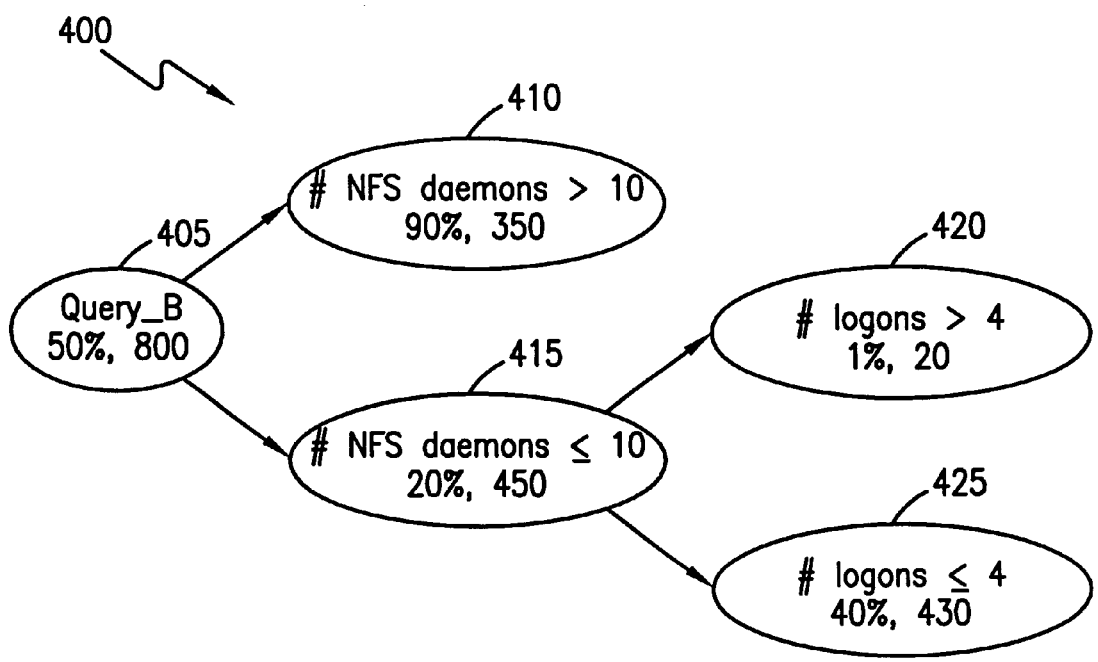
FIG. 4 is a sample output decision tree using several systems attributes.

A decision tree algorithm is preferably utilized in the output where the Boolean value evaluated from the test program data and the corresponding SLA is used as the target attribute of the decision tree. Although decision tree induction methods are well known to those skilled in the art, FIG. 4 is provided herein to illustrate its usage. In operation, a targeted system component is selected, either by an administrator or autonomously, for analysis, and a decision tree 400 generated. This target component forms a root node 405 of decision tree 400.

The specific example illustrated in FIG. 4 shows a decision tree 400 for a query to the aforementioned database 115(B) of FIG. 1, where the performance of the query (QUERY_B) through the system 100 is targeted for analysis. The 50% noted at the target element 405 indicates that this target has been determined to be satisfied in 50% of the instances, i.e., the target SLA (access time less than or equal to one second) was satisfied half the time. The numerical value following the success percentage, i.e., 800, is simply an indication of the number of instances at which state data was recorded over a given time period. In other words, at this root level of analysis, in 800 queries of database 115, the aforedescribed target SLA of 1 second was met only half the time.

The branches of the decision tree 400 from the root node 405, i.e., an upper 410 and a lower 415 branch or element, also include monitored values and their determined relation to the performance success or failure of the target element 405. The upper element 410 of the first branch, for instance, indicates the effect of the number of network file server (NFS) daemons on the success or failure of the target element 405. Branch 410 indicates that when the number of NFS daemons is greater than ten, the target element 405 (over a sample size of 350) was found to have acceptable performance 90% of the time. The evaluation of whether the target element 405 performance is acceptable is determined according to methods earlier discussed, specifically the methods of definition and evaluation of the performance thresholds or SLAs.

The lower branch 415 from the root node 405 indicates that when the number of NFS daemons is ten or less, the target element 405 (over a sample size of 450) has acceptable performance only 20% of the time. As shown in FIG. 4, the lower branch 415 is further split into sub-branches 420 and 425, denoting additional system attributes concerning the target element 405. Sub-branch 420 indicates that when the number of NFS daemons is less than or equal to ten and the number of logons to database 115 is greater than four, the performance of the target element 405/database 115 (over a sample size of 20) is acceptable only 1% of the time, clearly demonstrating a system resource problem. The other sub-branch 425 indicates that when the number of NFS daemons is ten or less and the number of database logons is four or less, the target element 405 (over a sample size of 430) has acceptable performance 40% of the time.

Since the Boolean evaluation of the test programs are recorded in the historical database 315 shown in FIG. 3 with associated monitored system state data, and due to the Boolean values of the SLA parameters being used as target attributes in the decision tree, the decision tree 400 describes the influence of the monitor values, and thus system component states, on the target attributes. Factors on system component states that affect system performance the most appear close to the root node 405 of the tree 400. This can be seen in the example depicted in FIG. 4 where the first branch gives obvious indication of the most causal relations effecting performance of the target element 405.

It should be understood, however, that the aforementioned dependency relation between the numbers of NFS daemons and database 115 logons has a high association, i.e., the aforedescribed samples of the states of the system 100 have a strong correlation. The results of the decision tree 400 may provide support for an existing model of the system 100, which has already identified these dependencies, or unearth a new relationship not defined in the model. In this manner the system model may be updated and refined to better describe the behavior of the system 100. Further description on the use of the aforementioned data mining principles in a model mining context is found in Applicants' aforementioned co-pending patent application.

Figure 5:
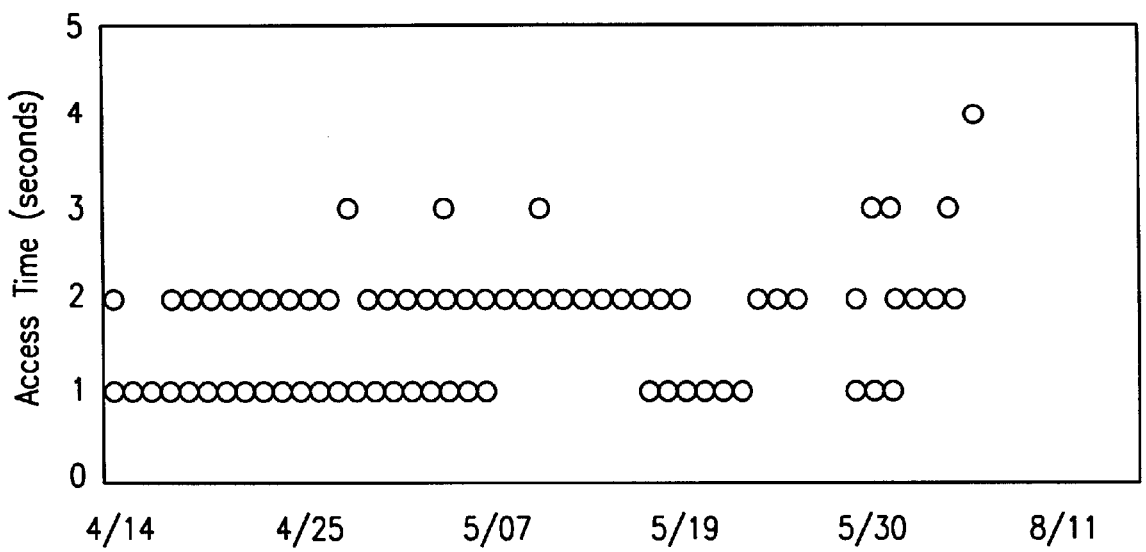
FIG. 5 is a scatter diagram of access time attributes for a conventional system.

As another example of the use of the aforedescribed decision trees, shown in FIG. 5 is a scatter diagram illustration of monitored values within the IT system 100 over time, particularly, the system access times to database 115. As is apparent from the diagram, although performance was good initially (most values at one second), over several weeks performance slowly decreased with most access times increasing to two, three and even four. Thus, the associated SLA for accessing database 115 is increasingly not met and an analysis of system performance is necessary to ascertain the source(s) of the problem.

Figure 6:
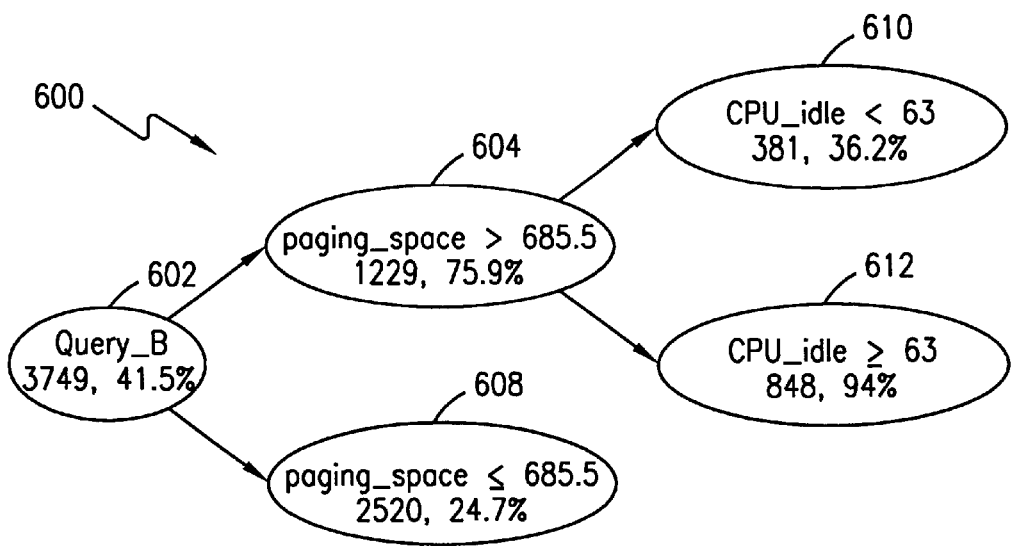
FIG. 6 is a second sample output decision tree utilizing other system attributes.

With reference now to FIG. 6, there is shown another decision tree 600 which is used in reviewing the impacts of various system attributes and determining the overall performance or "health" of the aforedescribed system 100, such as one exhibiting the performance problems shown in FIG. 5. With reference to the decision tree 600, it is apparent that the most important attribute in this IT system 100 for a query to database 115/B (root node 602) is the amount of paging space available, an indirectly influenced attribute. Queries to database 115 (in a sample size of 3,749) resulted in a 41.5% success rate in this underperforming system 100.

The branches of decision tree 600 from the root node 602, i.e., an upper 604 and a lower 608 branch or element, further define Boolean attributes for the paging space. For example, node 604 indicates that when the paging space is greater than a 685.5 system value, the target element 602, i.e., the query to database 115, is satisfied 75.9% of the time (over a sample size of 1,229), and node 608 indicates that when the paging space is less than or equal to 685.5, the target element 602 attribute is satisfied but 24.7% of the time (over a sample size of 2,520). One conclusion can already be made from the decision tree 600, i.e., performance improvement can be gained simply by increasing hardware, especially hard disks and memory, thereby increasing the chance that the 685.5 threshold is met.

Upper branch 604 in FIG. 6 is further divided into two sub-branches, i.e., an upper 610 and a lower 612 sub-branch. If the central processor (CPU) of one of the servers, such as the one servicing gateway database 115, is idle less than 63% of its uptime (sub-branch 610), then performance drops to 36.2% (in a sample size of 381). In other words, if the CPU becomes more active, system performance suffers accordingly. Conversely, if the CPU idle is greater than or equal to 63%, indicating greater CPU processing capability (sub-branch 612), system performance markedly increases to 94% (in a sample size of 848). As above, performance improvement is gained by ensuring processor availability, e.g., by installing a more powerful processor or additional processors.

It should be understood that the previous examples depicted in FIGS. 4 and 6 are merely hypothetical and intended only to demonstrate the functionality of the present invention. Decision trees used in the present invention would likely involve a great number of branches and relations depicted by these branches. Furthermore, it should be apparent that separate decision trees would exist for each individual attribute targeted for evaluation, and that different attributes could be targeted, generating different decision trees which would offer further insight into system 100 functionality as demonstrated when comparing FIGS. 4 and 6.

It should further be understood that trend analysis may be performed to predict potential system failures at one or more target components at a future date. In particular, regression analysis can be performed on the parameters close to the root node, e.g., 405 or 602, to predict whether or not the system component will remain in a "bad" branch of the decision tree, i.e., the component consistently underperforms. It should also be understood that conventional regression analysis may be employed in performing these predictions, e.g., by utilizing a least-squares method to calculate a straight (or other) line that best fits the available data, such as the nodal parameters in the decision tree. Future system performance of targeted components may then be extrapolated and the requisite predictions made.

One problem with the above scheme, however, is attribute overshadowing by other attributes. Overshadowing occurs when different attributes would cause a similar split for the target attribute (the query to database 115). The better attribute, i.e., the one better describing the nature of the target, would appear in the decision tree as taking away the effect of splitting on the similar attribute. This occurrence could, therefore, omit attributes from the decision tree that may be very indicative of the health of the overall system 100, such attributes being overshadowed by the locally better attribute. In an effort to avoid the effects of attribute overshadowing, an attribute list may be constructed which identifies those attributes exhibiting the best indications for the health of the system. Such an attribute list may be forming by repeatedly constructing a decision tree of depth 1 and putting the first attribute of the tree into the attribute list, simultaneously removing that inserted attribute from an input attributes list. In other words and with reference to FIGS. 4 and 6, the attributes for paging-space and NFS daemons would be included in the list, along with any other correlated attributes.

As discussed, a number of benefits can be realized with the generation of the aforementioned decision trees, e.g., trend analysis for predicting future system failures and performing preventive maintenance. Performance optimization is readily apparent in reviewing the output of the decision trees, e.g., the increase in memory and daemon resources. It should be understood that since parameters close to the root of the decision tree generally have the greatest influence on performance, different actions might be suggested to optimally influence those parameters. Monitor 310 optimization is another benefit that may be realized from the implementation of the principles of the present invention. Based on an analysis of the tree decisions, certain monitors 310 may be more or less relevant than other monitors with respect to a particular SLA. The positions of these monitors 310, or the monitor's frequency of data capture, could then be adjusted accordingly to facilitate a better analysis of the system 100.

With the functionality of the present invention having now been described, additional understanding may be had with further reference to the system 100 shown in FIG. 1, in which the present invention may be employed.

In devising a proper monitoring scheme for querying database 105 or 115, it is apparent that monitors 310 taking system state information would be desired at least at user workstations 140 and 145, at which the queries may be made, a network hub 135, and the aforedescribed servers 110 and 120. State information would be desired at a minimum of these locations since all are directly involved in the path of required communication. With monitors placed at the aforementioned locations, it would be possible to define SLAs for both client- and server-side performance.

Furthermore, since one of the objects of the present invention is to uncover hidden or unexpected relations, a monitor 310 may also be placed at a printer 155, servicing the workstations 140 and 145, and synchronized with the test program of the SLA for querying database 115 or 105. Although it would not typically be expected for printer 155 to have any relation with the performance of workstation 140 or 145 users querying databases 115 or 105, the printer 155 is physically coupled to workstations 140 and 145, which themselves are coupled through the network 100 to the servers 110 and 120, as well as another server 160 and potentially many more components via the network hub 135. Such coupling can be seen to be a minimum requirement for functional interaction between various network 100 elements. Additionally, assume a network printer 165, servicing the network 100, is only online during certain hours of the day. During the hours in which the network printer 165 is online, it would be desirable to monitor state information of this printer to evaluate of the SLA related to querying databases 105 or 115.

Although the aforedescribed SLAs were defined with respect to the server side, inspection of FIG. 1 indicates why it is desirable that separate SLAs and corresponding test programs be defined additionally on the client side. For a client-side SLA, for instance an SLA for querying database 105 with the performance threshold defined as that time measured for startup of database 105 from initial user query, it is seen that these SLAs would not be identical. For this client-side SLA, it would be necessary to account for the delay encountered from the client-side workstation, either 140 or 145, through the hub 135 to the server 110. Since this communication path is not traversed when measuring from the server-side, it is reasonable to expect that the threshold on the client-side for this case to be slightly larger than the server-side threshold.

Furthermore, by having a client-side SLA related to the same function as an SLA defined to evaluate a server-side function, additional information may be recovered. In this example, by taking monitoring data on client-side information and having separate SLAs and separate test programs defined on the client side, information would be recovered that could determine relationships between the specified function, the involved servers and workstations, and the network hub 135. By defining and operating the test function solely server side, the same relations may be found as long as monitoring activity included workstation and hub states, but such relations may be determined more quickly by including SLAs and associated test programs both server and client side.

Consistent with the ongoing discussion, when all network 100 elements are functioning and monitored, there are SLAs defined client side and server side for the example database queries within the architecture depicted in FIG. 1. There will, therefore, be test programs launched client side and server side that simulate these queries from their respective sides of the network 100. Furthermore, these test programs are preferably synchronized with the aforementioned monitoring activities at the above-specified locations, which all constitute network 100 elements illustrated in FIG. 1.

The above, however, is not intended to suggest that, at execution of each defined SLA test program, state monitoring is performed at every available monitor 310. For instance, when the network printer 165 is taken offline at controlled and specified intervals, it is not necessary to take state information on this element when any test programs are executed. Furthermore, there would likely be network elements that are identified as physically (or otherwise) decoupled from those elements involved in certain functions. If such decoupled elements are properly identified, monitoring activity on these elements would not be necessary in the test program execution.

Throughout the discussion of the present invention, consideration has been given to essentially two functions and the development of thresholds (SLAs), monitoring activity, and analysis of such data. It should be apparent, however, that the present invention may include even more of such functions, with associated test programs, thresholds, associated synchronized element state monitoring, and subsequent analysis and model modification, as is understood by one skilled in the art.

As discussed, further description on additional features of the preferred embodiments of the present invention may be found in Applicants' co-pending patent application, incorporated herein by reference.

Although a preferred embodiment of the system and method the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In an information technology system having a multiplicity of interconnected nodes, a method for optimizing performance monitoring of said system, said method comprising the steps of:

(a) performing a continuity analysis on said system;

(b) automatically generating a plurality of performance models of said system based on periodic measurements of predefined performance levels;

(c) continuously monitoring, at a plurality of said nodes, the performance of said system at the respective plurality of said nodes;

(d) collecting, periodically, performance data on said system at said respective nodes;

(e) applying a plurality of data mining techniques to said periodically collected system performance data and its associated test program data;

(f) generating a decision tree using said periodically collected system performance data, said decision tree having a multiplicity of decision nodes, each said decision node corresponding to a component of said system;

(g) comparing a plurality of relationships within said system between said system performance data and said test program data;

(h) automatically modifying said steps of continuously monitoring and periodically collecting said system performance data at a plurality of said nodes, whereby said autonomous modification iteratively optimizes said continuous performance monitoring of said system; and (i) automatically updating an adaptive system model according to newly discovered relationships.

2. The method according to claim 1, wherein said steps (a)–(i) are repeated a plurality of times, whereby said continuous performance monitoring of said system is further optimized.

3. The method according to claim 1, further comprising, prior to said steps of continuous monitoring and periodic collecting, the step of:

generating a test program pursuant to at least one service level agreement, said plurality of nodes for continuous monitoring and periodic performance data collection being selected pursuant to said at least one service level agreement.

4. The method according to claim 3, wherein said test program targets a target component within said system, said target component being selected from the group consisting of a system hardware resource and a system software application.

5. The method according to claim 4, wherein said target component substantially corresponds to a root decision node of said decision tree.

6. The method according to claim 4, wherein said target component targeted by said test program is an underperforming system component, whereby said step of automatic modifying modifies said steps of continuously monitoring and periodically collecting said performance data on said underperforming system component.

7. The method according to claim 1, wherein said step of automatic modifying modifies the periodicity of said continuous monitoring and periodic collection of said performance data.

8. The method according to claim 7, wherein said periodicity increases after said modification.

9. The method according to claim 7, wherein said periodicity decreases after said modification.

10. The method according to claim 1, further comprising the step of:

storing said performance data.

11. The method according to claim 10, wherein said performance data is stored with an associated time stamp.

12. The method according to claim 10, wherein said performance data is stored in a relational database.

13. The method according to claim 1, wherein said step of generating said decision tree comprises decision tree induction.

14. The method according to claim 1, wherein said performance data comprises a respective plurality of state information at said plurality of said nodes.

15. The method according to claim 14, wherein said performance data further comprises a respective plurality of system information at said plurality of said nodes.

16. The method according to claim 15, wherein said system information comprises a plurality of service level agreements.

17. The method according to claim 1, wherein said performance data in said step of periodic collecting is collected periodically at specific time intervals.

18. The method according to claim 17, wherein said specific time intervals for periodically collecting said performance data is selected from the group consisting of days, hours, minutes and seconds.

19. The method according to claim 1, wherein said performance data periodically collected in said step of periodic collecting has a value selected from the group consisting of real numbers, integers and Booleans.

20. The method according to claim 1, wherein said performance data periodically collected in said step of periodic collecting is converted to a plurality of Boolean values.

21. The method according to claim 20, wherein said plurality of Boolean values correspond to a plurality of performance threshold conditions.

22. The method according to claim 21, wherein said performance threshold conditions are predetermined.

23. The method according to claim 21, wherein said performance threshold conditions are variable.

24. The method according to claim 1, wherein said performance data periodically collected in said step of periodic collecting is averaged at specific time intervals.

25. The method according to claim 24, wherein said averaged performance data is converted to at least one Boolean value.

26. The method according to claim 25, wherein said at least one Boolean value corresponds to at least one service level agreement within said system.

27. The method according to claim 1, wherein in said step of generating, regression analysis is performed on at least one target component corresponding to a target node of said decision tree, whereby the performance of said at least one target component is predicted at a future time from a plurality of parameter data within a plurality of said decision nodes.

28. An information technology system having a multiplicity of interconnected nodes, said system comprising:

performance means for performing a continuity analysis on said system;

generating means for automatically generating a plurality of performance models of said system based on periodic measurements of predefined performance levels;

monitor means, for continuously monitoring, at a plurality of said nodes, the performance of said system at the respective nodes;

collection means for periodically collecting, at said plurality of said nodes, performance data for said system at specific time intervals;

data mining technique application means for applying a plurality of data mining techniques to said collected system performance data and its associated test program data;

decision tree generation means for generating a decision tree using said periodically collected system performance data, said decision tree having a multiplicity of decision nodes, each said decision node corresponding to a component of said system;

comparison means for comparing a plurality of relationships within said system between said system performance data and said test program data;

modification means for automatically modifying said monitor and collection means for the continuous monitoring and periodic collection, respectively, of said system performance data; and updating means for automatically updating an adaptive system model according to newly discovered relationships.

29. The system according to claim 28, further comprising:
test program generation means for generating a test program pursuant to at least one service level agreement.

30. The system according to claim 29, wherein said test program targets a target component within said system.

31. The system according to claim 30, wherein said target component substantially corresponds to a root decision node of said decision tree.

32. The system according to claim 31, wherein said target component is selected from the group consisting of a system hardware resource and a system software application.

33. The method according to claim 31, wherein said target component substantially corresponds to a root decision node of said decision tree.

34. The method according to claim 33, wherein said target component targeted by said test program is an underperforming system component, whereby said modification means automatically modifies the continuous monitoring and periodic collecting of said performance data on said underperforming system component by said monitor and collection means, respectively.

35. The system according to claim 28, wherein said modification means automatically modifies the periodicity of said performance data continuous monitoring and periodic collection by said monitor and collection means, respectively.

36. The system according to claim 35, wherein said periodicity increases after said autonomous modification.

37. The system according to claim 35, wherein said periodicity decreases after said autonomous modification.

38. The system according to claim 28, further comprising:
storage means for storing said periodically collected performance data.

39. The system according to claim 38, wherein said performance data is stored with an associated time stamp.

40. The system according to claim 38, wherein said storage means is a relational database.

41. The system according to claim 28, wherein said decision tree generation means generates said decision tree using decision tree induction.

42. The system according to claim 28, wherein said performance data comprises a respective plurality of state information at said plurality of said nodes.

43. The system according to claim 42, wherein said performance data further comprises a respective plurality of system information at said plurality of said nodes.

44. The system according to claim 43, wherein said system information comprises a plurality of service level agreements.

45. The system according to claim 28, wherein said collection means periodically collects said performance data periodically at specific time intervals.

46. The system according to claim 45, wherein said specific time intervals for periodically collecting said performance data is selected from the group consisting of days, hours, minutes and seconds.

47. The system according to claim 28, wherein said performance data periodically collected by said collection means has a value selected from the group consisting of real numbers, integers and Booleans.

48. The system according to claim 28, wherein said performance data collected periodically by said collection means is converted to a plurality of Boolean values.

49. The system according to claim 48, wherein said plurality of Boolean values correspond to a plurality of performance threshold conditions.

50. The method according to claim 49, wherein said performance threshold conditions are predetermined.

51. The method according to claim 50, wherein said performance threshold conditions are variable.

52. The system according to claim 28, wherein said performance data periodically collected by such collection means is averaged at specific time intervals.

53. The system according to claim 52, wherein said averaged performance data is converted to at least one Boolean value.

54. The system according to claim 53, wherein said at least one Boolean value corresponds to at least one service level agreement within said system.

55. The system according to claim 28, wherein said decision tree generation means employs regression analysis on at least one component of said decision tree, whereby the performance of said at least one target component is predicted at a future time from a plurality of parameter data within a plurality of said decision nodes.

56. An article of manufacture comprising a computer usable medium having computer readable program code means embodied thereon for optimizing performance monitoring of at least one node in an information technology system, the computer readable program code means in said article of manufacture comprising:

computer readable program code means for:
(a) performing a continuity analysis on said system;
(b) automatically generating a plurality of performance models of said system based on periodic measurements of predefined performance levels;
(c) continuously monitoring, at a plurality of said nodes, the performance of said system at the respective plurality of said nodes;
(d) collecting, periodically, performance data on said system at said respective nodes;
(e) applying a plurality of data mining techniques to said periodically collected system performance data and its associated test program data;
(f) generating a decision tree using said periodically collected system performance data, said decision tree having a multiplicity of decision nodes, each said decision node corresponding to a component of said system;

(g) comparing a plurality of relationships within said system between said system performance data and said test program data;
(h) automatically modifying said steps of continuously monitoring and periodically collecting said system performance data at a plurality of said nodes, whereby said autonomous modification iteratively optimizes said continuous performance monitoring of said system; and
(i) automatically updating an adaptive system model according to newly discovered relationships.

57. A program storage device readable by a machine and encoding a program of instructions for executing the method steps of claim 1.

58. The method according to claim 1, wherein said newly discovered relationships are uncovered or unexpected relations.

59. The system according to claim 28, wherein said newly discovered relationships are uncovered or unexpected relations.

* * * * *